Figure 1:
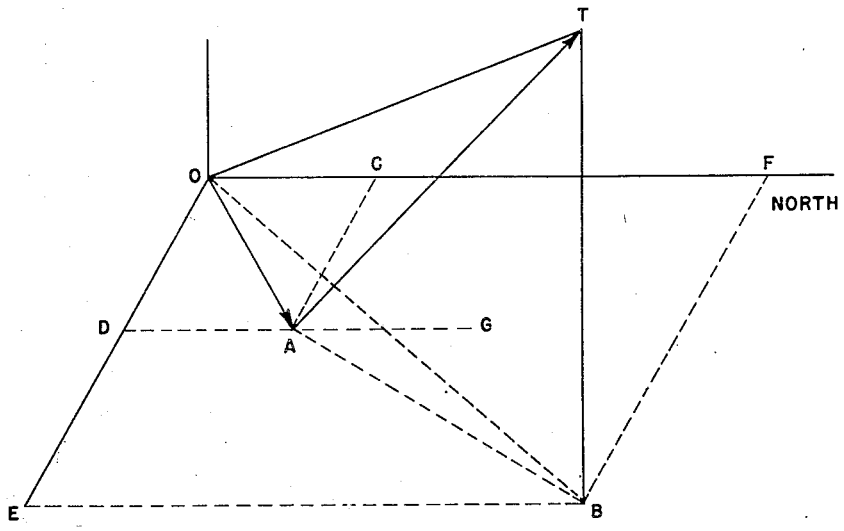

Aug. 31, 1954  D. GOLD  2,687,850
TRIGONOMETRIC VECTOR CALCULATOR FOR FIRE CONTROL
Filed Aug. 24, 1950

INVENTOR
DAVID GOLD

BY
*G. D. O'Brien*
*Q. Baxter Warner*
ATTORNEYS

Patented Aug. 31, 1954

2,687,850

UNITED STATES PATENT OFFICE 2,687,850

TRIGONOMETRIC VECTOR CALCULATOR FOR FIRE CONTROL

David Gold, Washington, D. C.

Application August 24, 1950, Serial No. 181,253

6 Claims. (Cl. 235—61.5)

(Granted under Title 35, U. S. Code (1952), sec. 266)

The invention relates to improvements in electrical calculators and the primary object of the invention is to provide an improved and simplified calculator for solving trigonometric problems dealing with vector quantities.

Existing electrical techniques of solving trigonometric problems require the use of resolvers to resolve each vector into rectangular components represented by voltages of the same time phase followed by the addition of the vector components and the use of a resolver to recombine the components into the desired result. The existing methods therefore require the use of numerous servos, booster amplifiers and compensators to raise power levels, correct for undesired phase shifts, etc.

Another important object of the invention is the provision of a method of computation based on the representation of a vector, or a quantity or function which can be represented by a vector, by an alternating voltage or current whose time phase relative to a reference is representative of the vector angle and whose magnitude is proportional to the length or magnitude of the vector. By the use of time phase as well as magnitude of the voltage or current considerably more information can be incorporated into a given voltage or current thereby simplifying computation of certain types of problems such as trigonometric ones. This method is particularly suited for the solution of fire control problems requiring the addition of vectors and consists of representing a vector by a selective-phase voltage derived by appropriate positioning of a synchro excited by three-phase voltages or a resolver excited by a two-phase source. The addition of vectors is then accomplished by simple addition of the variable phase voltages after adjusting each to correspond to the appropriate magnitude. By use of a phase-sensitive servo system the angle of the resultant vector can be indicated and the magnitude measured by a voltage indicator.

A further object of the invention is to provide a calculator using synchros or resolvers for the production of selective-phase, selective-magnitude voltages or currents constituting electrical analogs of mechanical vectors. Synchros each having a three-winding stator and a single-winding rotor provide a convenient means of obtaining a sum of two or more vectors. When the three-winding stator is excited by a three-phase voltage, the voltage induced in the single-winding rotor is of constant magnitude, but varies in phase from 0° to 360° as the rotor winding is rotated through 360°. The magnitude of the output vector can be varied by connecting an accurate voltage divider across the synchro output. If the outputs of two or more such synchros are connected in series, the resultant voltage will be the vector sum of the various output voltages. The resultant electrical vector can be converted to mechanical form by the use of a voltage-sensitive servo mechanism and a phase-sensitive servo mechanism to give respectively the magnitude and angle of the vector sum.

Figure 2:
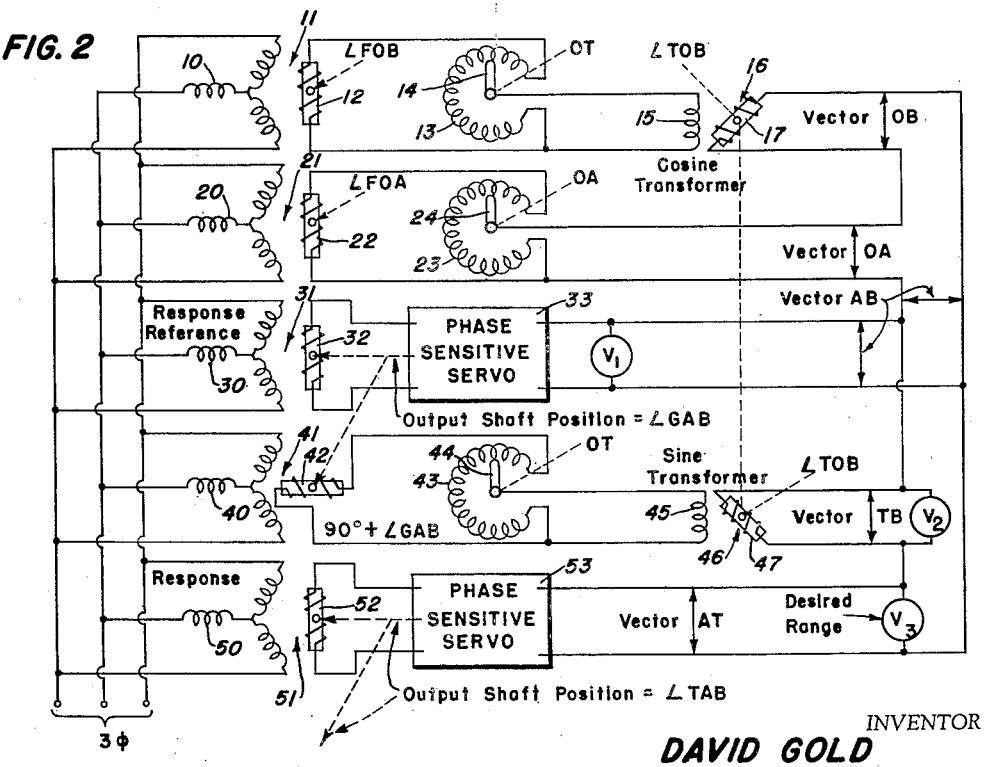

Other objects and advantages of the invention will become apparent during the course of the following detailed description, taken in connection with the accompanying drawing, forming a part of this specification, and in which drawing:

Fig. 1 is a diagrammatic view illustrating a typical fire control problem requiring the addition of vectors; and Fig. 2 is a diagrammatic view of one form of electrical calculator embodying the present invention and designed to solve the problem illustrated in Fig. 1.

The problem illustrated in Fig. 1 is to calculate the bearing and elevation of a target T relative to position A using target bearing and elevation data derived by measuring from another position of observation O. In solving the problem, the following ranges, elevations and bearing angles shown in Fig. 1 are dealt with:

$OT$=measured target range
$OA$=measured reference range
$AT$=desired target range
Angle $TOB$=measured elevation
Angle $TAB$=desired elevation
Angle $FOB$=measured target bearing
Angle $FOA$=measured reference bearing
Angle $GAB$=desired target bearing The first step in the solution of the problem according to this invention is to produce an A. C. electric signal whose time phase is related to the known target bearing angle FOB and whose voltage is commensurate with the unknown magnitude of the length OB. This signal constitutes an electrical vector equivalent to the mechanical vector OB illustrated in Fig. 1. Connected to the 3φ A. C. source in Fig. 2 is the three-winding stator 10 of a synchro 11 having a single-winding rotor 12. Connected across this rotor is a variable transformer 13 whose output, through an adjustable pickoff 14, energizes the stator winding 15 of a rotatable cosine transformer 16 having a rotary winding 17. The electrical vector OB is produced by setting the rotor 12 of synchro 11 at an angle equalling the measured target bearing angle FOB so as to obtain the proper time phase and by introducing an electrical signal commensurate with the magnitude of the known vector OT into the rotatable cosine transformer 15. An electrical signal of a magnitude commensurate with that of the measured target range OT is obtained upon proper setting of the variable transformer arm 14. The rotor 17 of the cosine transformer 15 is set at an angle equalling angle TOB so as to derive an output voltage commensurate with the unknown magnitude OB from the three-phase voltage in accordance with the equation $OT \cos \text{angle } TOB = OB$.

The second step of the problem is to convert the measured mechanical vector OA into an electrical vector whose time phase is related to the vector angle FOA and whose voltage is of a magnitude commensurate with the vector magnitude. Connected to the $3\phi$ A. C. source in parallel with the synchro 11 is the three-winding stator 20 of another synchro 21 having a single-winding rotor 22. The output of this synchro rotor 22 energizes a variable transformer 23 having an adjustable pickoff arm 24. The electrical vector corresponding to vector OA is generated by setting the rotor 22 of the synchro 21 at an angle equalling the measured target bearing angle FOA so as to obtain the proper time phase, and by setting the contact 24 of the transformer 23 so as to obtain the proper signal magnitude.

The third step of the problem is to obtain the value of the desired target bearing represented in Fig. 1 by angle GAB. Inasmuch as the rotor winding 17 of the cosine transformer 15 and the output of the variable potentiometer 23 are connected in series, the electrical vectors corresponding to vectors OB, OA combine to produce a resultant electrical vector AB whose time phase is related to the desired target bearing angle GAB and of a potential commensurate with the vector magnitude AB. The magnitude of this potential is continuously indicated by a suitable voltmeter $V_1$ or followed up with a servo if desired.

Connected in parallel with the $3\phi$ source is the three-winding stator 30 of a response reference synchro 31 having a single-winding rotor 32 whose signal output is transmitted to a phase-sensitive servo 33. This phase-sensitive servo 33 produces a shaft position angle equal to the angular difference between the reference vector signal output of synchro rotor 32 and the electrical vector AB. The output voltage of the reference synchro 30 has a constant magnitude but its phase with respect to the reference input excitation can vary from 0° to 360°. When the reference synchro output voltage is added to the voltage of the electrical vector AB, the minimum net voltage occurs when the phase of the reference synchro voltage is opposite that of the electrical vector voltage. The servo 33 is used to drive the reference synchro to a minimum output position and hence determine the phase angle of the electrical vector voltage. Thus, when the electrical vector AB is transmitted to the phase-sensitive servo 33, its output shaft position will correspond to the desired target bearing angle GAB. The magnitude of the electrical vector AB may be measured by a null method using a potentiometer (not shown) instead of the voltmeter $V_1$ if another servo is provided for so adjusting the potentiometer that its net voltage is zero.

The fourth step is to generate an electrical vector which is equivalent to the mechanical vector TB shown in Fig. 1. Connected in parallel with the $3\phi$ source is the three-winding stator 40 of another synchro 41 having a single-winding rotor 42 mechanically connected to turn with the previously mentioned synchro rotor 32 and with the output shaft of the phase-sensitive servo 33. The rotor 42 is however initially angularly displaced 90° relative to the rotor 32 so as to generate a voltage which is 90° time phase displaced from the voltage representing angle GAB and which can be added vectorially to the voltage AB. It is important to note that this addition of vectors AB and TB can be represented in a vertical plane as in Fig. 1, or in any other plane since essentially this addition may be considered as a new problem independent of previous operations. Connected across the single winding of the rotor 42 is a variable transformer 43 whose output, through an adjustable pickoff 44, energizes the stator winding 45 of a sine transformer 46 having a rotory winding 47. Because of its initial 90° displacement and its mechanical connection to the phase-sensitive servo 33, the servo rotor 42 will be displaced 90° plus angle GAB when the servo output shaft position corresponds to the target bearing angle GAB. Since the directions AB and TB are perpendicular, the output of the servo rotor 42 is of a time phase related to the direction TB. By setting the transformer pickoff 44 at position OT and the sine transformer rotor 47 at an angle equalling the measured elevation angle TOB, an electrical vector equivalent to the mechanical vector TB will be generated in accordance with the equation $OT \sin \text{angle } TOB = TB$. As previously noted in the statement of the problem, the angle FOB, which is the vertical projection of the vector OT on the horizontal and hence the bearing of vector OT, is a known quantity obtained by advance measurement before the start of the problem solution. The magnitude of this vector TB is continuously indicated by a suitable voltmeter $V_2$.

It may be noted that if synchro 31 has 2 rotor windings at 90° then synchro 41 may be eliminated since desired 90° phase related voltages will be available from a single unit.

The fifth step of the problem is to obtain the value of angle TAB which is the desired elevation. Energized by the $3\phi$ source is the three-winding stator 50 of a synchro 51 having a single-winding rotor 52 whose signal output is transmitted to a phase-sensitive servo 53. Also transmitted to the phase-sensitive servo 53 are the combined vector signals OB, OA and TB of the serially connected outputs of the transformers 16, 23, 46. The electrical vector AB resulting from addition of the vectors OB, OA when combined with the electrical vector TB, produces an electrical vector AT commensurate with its equivalent mechanical vector. The magnitude of vector AT is indicated by a suitable voltmeter $V_3$, or followed up with a servo, and the vector angle TAB, which is the desired elevation, is indicated by the output shaft position of the phase-sensitive servo 53.

From the foregoing it is clear that the calculator according to the construction shown in Fig. 2 may be utilized as a continuous computer of target bearing and elevation data related to one position while using target bearing and elevation measurements observed from another position.

The adjustable transformers 13, 23, 43, cosine transformer 16 and sine transformer 46 may be replaced with linear, cosine and sine potentiometers (not shown), respectively, if proper attention is given to resistance values so as to prevent errors from loading effects.

Various changes may be made in the forms of invention herein shown and described without departing from the spirit of the invention or the scope of the following claims.

The invention herein described may be manufactured and used by or for the Government of the United States of America for governmental purposes without the payment of any royalties thereon or therefor.

What is claimed is:

1. In a computer for determining the range, elevation angle and azimuth angle of a target from a remote director with respect to a firing station, means for generating an electrical signal having a time-phase and magnitude commensurate with the azimuth angle and the cosine of the range respectively of the target from the director, means for generating a second electrical signal having a time-phase and magnitude commensurate with the azimuth angle and the range respectively of the firing station from the director, means for mixing said signals to produce an electrical signal which in time-phase displacement and amplitude is the resultant of said signals, phase sensitive means for determining the time-phase of said resultant signal, means coupled with said phase sensitive means for generating a third electrical signal having a magnitude commensurate with the sine of the target range and a time-phase equal to that of the resultant plus 90°, and means for mixing the resultant signal with the third signal to produce an electrical signal that is commensurate in magnitude and phase to the range and elevation angle of the target with respect to the firing station.

2. In a computer for determining the range, elevation angle and azimuth angle of a target from a remote director with respect to a firing station, means for generating an electrical signal having a time-phase and magnitude commensurate with the azimuth angle and the cosine of the angle respectively of the target from the director, means for generating a second electrical signal having a time-phase and magnitude commensurate with the azimuth angle and the range respectively of the firing station from the director, means for mixing said signals to produce an electrical signal which in time-phase displacement and amplitude is the resultant of said signals, phase sensitive means for determining the time-phase of said resultant signal, means coupled with said phase sensitive means for generating a third electrical signal having a magnitude commensurate with the sine of the target range and a time-phase equal to that of the resultant signal plus 90°, means for mixing the resultant signal with the third signal to produce an electrical signal that is commensurate in magnitude and phase to the range and elevation angle of the target with respect to the firing station, and means for continuously indicating the phase displacement and amplitude of the signal representing said elevation angle and range.

3. In a computer for determining the range, elevation angle and azimuth angle of a target from a remote director with respect to a firing station, means for generating an electrical signal having a time-phase and magnitude commensurate with the azimuth angle and the cosine of the range respectively of the target from the director, means for generating a second electrical signal having a time-phase and magnitude commensurate with the azimuth angle and the range respectively of the firing station from the director, means for mixing said signals to produce an electrical signal which in time-phase displacement and amplitude is the resultant of said signals, phase sensitive means for determining the time-phase of said resultant signal, a synchro having a rotor mechanically coupled to said phase sensitive means and responsive thereto for generating a signal having a time-phase equal to the phase of said resultant plus 90°, means coupled with the electrical output of said rotor for generating an electrical signal having a magnitude commensurate with the sine of the target range and a time-phase equal to that of the resultant plus 90°, means for mixing the resultant signal with the third signal to produce an electrical signal that is commensurate in magnitude and phase to the range and elevation angle of the target with respect to the firing station, and means for continuously indicating the phase displacement and amplitude of the signal representing said elevation angle and range.

4. In a computer for determining the range, elevation angle and azimuth angle of a target from a remote director with respect to a firing station, means for generating an electrical signal having a time-phase and magnitude commensurate with the resultant of mathematical vectors representing the range of the firing station from the director and the projection in the plane of said station of the range of the target from the director, a phase sensitive means for determining the azimuth angle of said target from said station, means coupled with said phase sensitive means for generating an additional electrical signal having a magnitude commensurate with the sine of the target range and a time-phase equal to the azimuth of said resultant plus 90°, means for mixing the resultant signal with the additional signal to produce an electrical signal that is commensurate in magnitude and phase to the range and elevation angle of the target with respect to the firing station.

5. In a computer for determining the range, elevation angle and azimuth angle of a target from a remote director with respect to a firing station, means for generating an electrical signal having a time-phase and magnitude commensurate with the resultant of mathematical vectors representing the range of the firing station from the director and the projection in the plane of said station of the range of the target from the director, a phase sensitive means for determining the azimuth angle of said target from said station, means coupled with said phase sensitive means for generating an additional electrical signal having a magnitude commensurate with the sine of the target range and a time-phase equal to the azimuth angle of said resultant plus 90°, means for mixing the resultant signal with the additional signal to produce an electrical signal that is commensurate in magnitude and phase to the range and elevation angle of the target with respect to the firing station, and means for continuously indicating the phase displacement and amplitude of the signal representing said elevation angle and range.

6. In a calculator for determining the range, elevation angle and azimuth angle of a target from a remote director with respect to a firing station, means for generating an electrical signal having a time-phase and magnitude commensurate with the resultant of mathematical vectors representing the range of the firing station from the director and the projection in the plane of said station of the range of the target from the director, a phase sensitive means for determining the azimuth angle of said target from said station, a synchro having a rotor mechanically coupled to said phase sensitive means and responsive thereto for generating a signal having a time-phase equal to the azimuth angle of the resultant plus 90°, means coupled with the electrical output of said rotor for generating an additional electrical signal having a magnitude commensurate with the sine of the target range and a time-phase equal to that of the angle of the resultant plus 90°, means for mixing the resultant signal with the additional signal to produce an electrical signal that is commensurate in magnitude and phase to the range and elevation angle of the target with respect to the firing station, and means for continuously indicating the phase displacement and amplitude of the signal representing said elevation angle and range.

References Cited in the file of this patent

UNITED STATES PATENTS

| Number | Name | Date |
|---|---|---|
| 2,151,718 | Riggs | Mar. 28, 1939 |
| 2,425,386 | Norton | Aug. 12, 1947 |
| 2,427,463 | Klemperer et al. | Sept. 16, 1947 |
| 2,428,800 | Holden | Oct. 14, 1947 |
| 2,447,517 | Manson | Aug. 24, 1948 |
| 2,467,179 | Andresen | Apr. 12, 1949 |
| 2,467,646 | Agins | Apr. 19, 1949 |
| 2,519,180 | Ergen | Aug. 15, 1950 |
| 2,560,527 | Dehmel | July 10, 1951 |
| 2,591,846 | Mann et al. | Apr. 8, 1952 |
| 2,600,159 | Ergen | June 10, 1952 |
| 2,611,537 | White et al. | Sept. 23, 1952 |

FOREIGN PATENTS

| Number | Country | Date |
|---|---|---|
| 620,867 | Great Britain | Mar. 31, 1949 |

OTHER REFERENCES

Electronic Instruments, volume 21, M. I. T. Radiation Laboratory, Series (1940–1945) by Greenwood et al.; McGraw-Hill; pages 140–157 and 201–205.